F. H. JONES.
TRANSMISSION GEARING.
APPLICATION FILED FEB. 3, 1910.

992,718.

Patented May 16, 1911.

3 SHEETS—SHEET 1.

Witnesses
Frank A. Fahle
Thomas W. McMeans

Inventor
Frank H. Jones,
By Bradford Hood
Attorneys

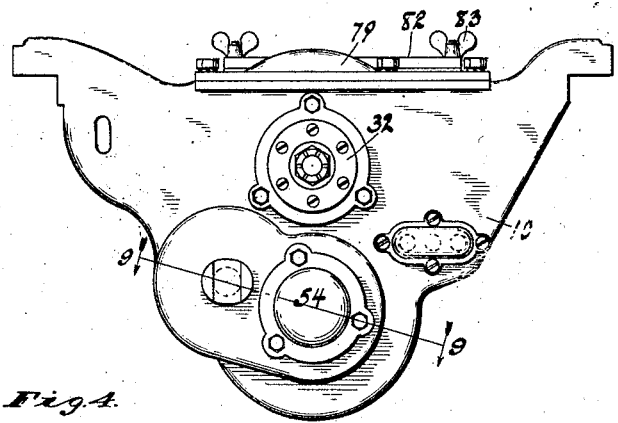
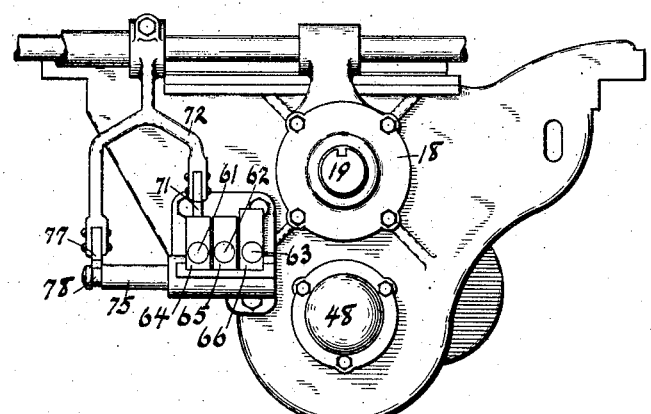
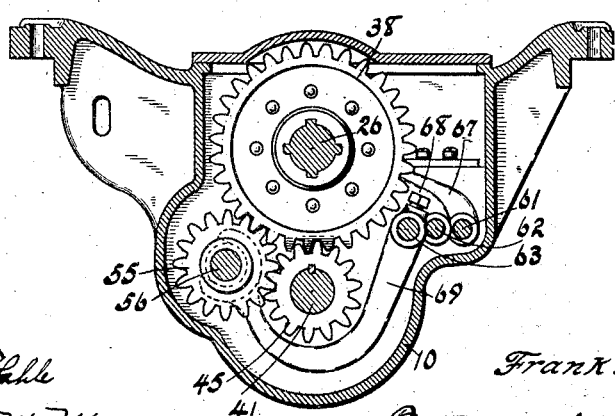

F. H. JONES.
TRANSMISSION GEARING.
APPLICATION FILED FEB. 3, 1910.

992,718.

Patented May 16, 1911.
3 SHEETS—SHEET 3.

Witnesses
Frank A. Fable
Thomas W. McMeans

Inventor
Frank H. Jones,
By Bradford Hood.
Attorneys

UNITED STATES PATENT OFFICE.

FRANK H. JONES, OF MUNCIE, INDIANA, ASSIGNOR TO WARNER GEAR COMPANY, OF MUNCIE, INDIANA, A CORPORATION OF INDIANA.

TRANSMISSION-GEARING.

992,778.     Specification of Letters Patent.     Patented May 16, 1911.

Application filed February 3, 1910. Serial No. 541,782.

*To all whom it may concern:*

Be it known that I, FRANK H. JONES, a citizen of the United States, residing at Muncie, in the County of Delaware and State of Indiana, have invented a certain new and useful Transmission-Gearing, of which the following is a specification.

The object of my invention is to produce a very compact sliding-gear speed-varying transmission mechanism inclosed in a dust proof casing of such form that all of the parts may be readily reached, and provided with means by which the shiftable gears may be readily shifted without possibility of improper interengagement.

The accompanying drawings illustrate my invention.

Figure 1:
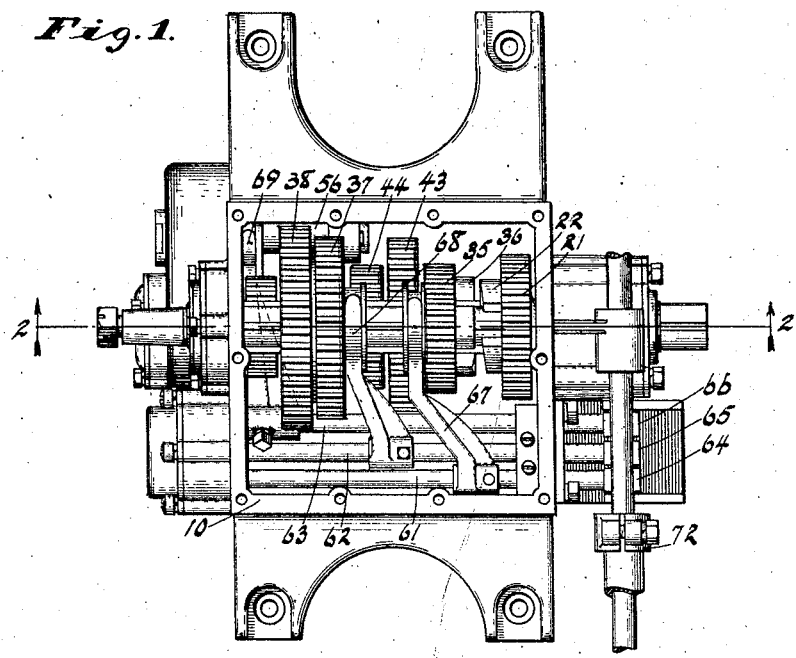
Figure 2:
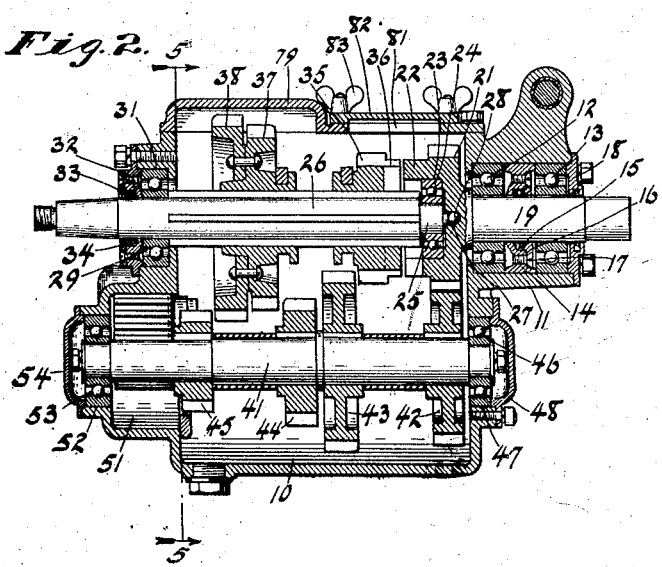
Figure 6:
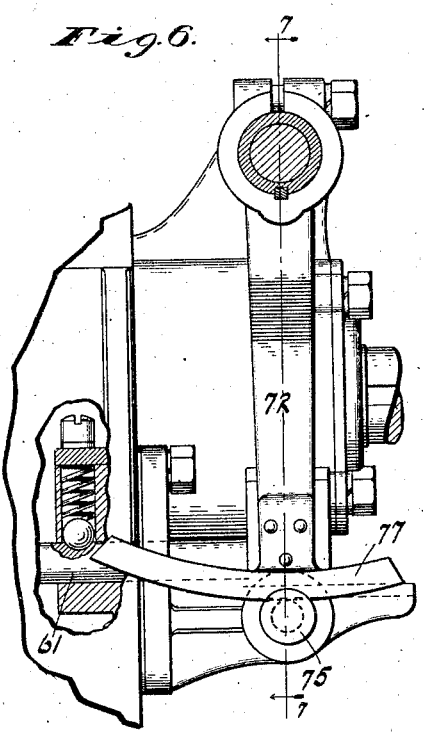
Figure 7:
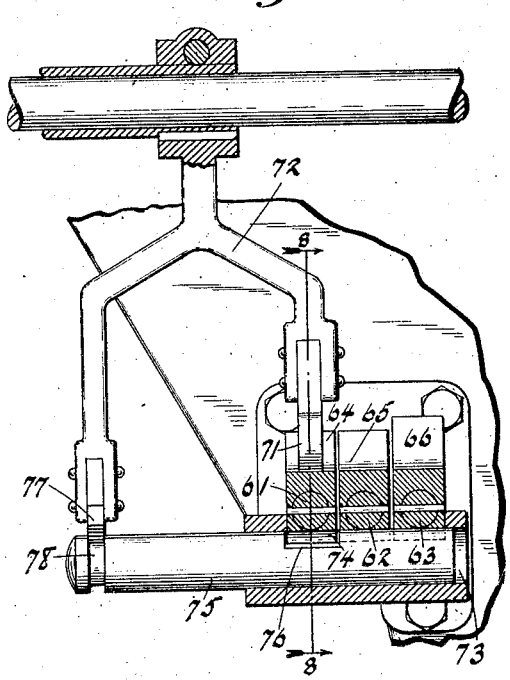
Figure 9:
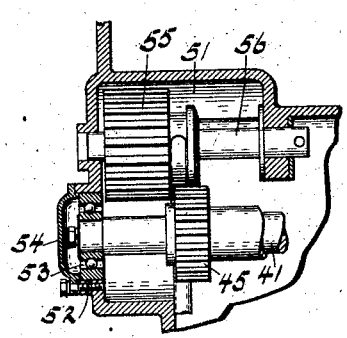
Figure 8:
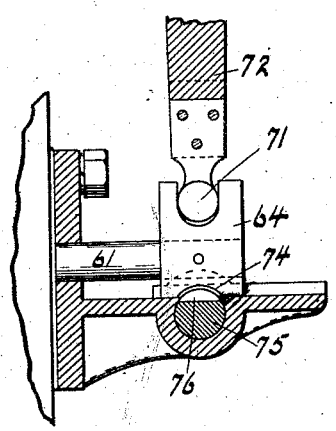

Figure 1 is a plan with the main cover plate removed; Fig. 2 a section on line 2—2 of Fig. 1; Fig. 3 an elevation of one end; Fig. 4 an elevation of the opposite end; Fig. 5 a section on line 5—5 of Fig. 2; Fig. 6 an enlarged detail of the interlocking gear shifting mechanism; Fig. 7 a section on line 7—7 of Fig. 6; Fig. 8 a section on line 8—8 of Fig. 7, and Fig. 9 a section on line 9—9 of Fig. 3.

In the drawings, 10 indicates the main body of the inclosing casing which is preferably formed by a single casting and possesses the peculiarities which will be hereinafter pointed out. At one end, casing 10 is provided with a hollow boss 11 in which are mounted two ball bearings 12 and 13 and a packing ring 14. Ring 14 lies between bearings 12 and 13 and is formed to contain packing 15 held in place by a removable ring 16 fastened by screws 17. The outer end of the opening in boss 11 is closed by a ring 18 detachably secured in place and fitting closely a shaft 19, which passes therethrough and is supported by the bearings 12 and 13. Formed integrally with, or secured to, the inner end of shaft 19 is a combined gear 21 and clutch member 22. Within the member 21—22 I form an axial pocket 23 which is adapted to receive the outer race of a ball bearing 24 the inner race of which receives the small end 25 of a main shaft 26 which is in alinement with shaft 19. Formed in the axis of shaft 19 at the bottom of pocket 23 is a ball pocket 27 in which is mounted a ball 28 against which the inner end of shaft 26 is projected. The opposite end of shaft 26 is supported by the inner race of a ball bearing 29 the outer race of which is received in a pocket formed in an end wall of casing 10. The ball bearing 29 is held in pocket 31 by means of a removable packing ring 32 which contains a packing 33 held in place by the removable ring 34. Slidably mounted upon shaft 26 is a combined gear 35 and clutch member 36, which clutch member is adapted to interengage with the clutch member 22. Also slidably mounted on shaft 26 is a double gear 37 and 38.

Parallel with shaft 26 is a countershaft 41 to which are rigidly secured a gear 42, continuously in mesh with gear 21; a gear 43, adapted to mesh with gear 35; a gear 44, adapted to mesh with gear 37; and a gear 45, adapted to mesh with gear 38. Gear 42 lies close to one end wall of casing 10 and the short projecting end of shaft 41 is supported by a ball bearing 46 mounted in a suitable opening 47 formed in the said end wall and held in place by a removable cap 48. At the opposite end of shaft 41 is the gear 45, and the adjacent end wall of casing 10 is, at this point, provided with a pocket 51 the size of which is considerably in excess of the diameter of gear 45, and the depth of which exceeds the projection of shaft 41 beyond gear 42. At the outer end of pocket 51, concentric with shaft 41, is an opening 52 which receives the outer race of a ball bearing 53, the inner race of which supports shaft 41, and this ball bearing is held in place by an outwardly removable cap 54.

Pocket 51 is transversely extended to one side of the shaft 41 in order to receive a reversing gear 55 which is slidably journaled upon a pin 56. When the gear 55 lies wholly within pocket 51 it is beyond the plane of gear 45. Gear 55 has a width slightly greater than the width of gear 45 plus the width of gear 38, for a purpose which will appear, and it is shiftable axially on pin 56 an amount slightly in excess of its width.

Slidably mounted in casing 10, parallel with the gear-carrying shafts, are three shifting rods 61, 62 and 63 provided at their outer ends with transversely slotted heads 64, 65 and 66, respectively. Rod 61 carries a shifting yoke 67 which engages gear 45; rod 62 carries a shifting yoke 68 which engages the combined gear 37, 38; and rod 63 carries a yoke 69 which engages gear 55. In order to shift rods 61, 62 and 63, I provide a finger 71 adapted to be moved into the transverse slot of any one of the heads 64, 65 and 66, and this finger 71 is carried by a longitudinally shiftable oscillating lever 72. It is essential that, when any one of the rods 61, 62, and 63 is shifted, the other two rods be held against movement, and for this purpose I provide a bore 73 which extends transversely across the heads 64, 65 and 66 and intersects the lower surfaces thereof, each of said lower surfaces being therefore provided with an arc-shaped transverse groove 74. Slidably mounted in bore 73 is a locking pin 75 provided with a single transverse groove 76 which has a width and depth sufficient to permit the movement of either one of the heads 64, 65 or 66 therethrough. In order to shift the locking pin 75 I provide lever 72 with an arc-shaped finger 77 which lies in a groove 78 formed in the locking pin so that the locking pin will partake of all of the longitudinal movements of lever 72 but will not be affected by its oscillation.

The upper side of casing 10 is open practically throughout the entire extent of the gear-containing chamber and is covered by a removable cover 79. In order to permit the introduction of lubricant and the ready examination of the gears, the cover 79 is provided with an opening 81 which is covered by a supplemental cover plate 82 held in place by readily removable butterfly nuts 83.

The operation is as follows: For low speed forward, lever 72 will be shifted longitudinally to its middle position, thus bringing finger 71 into the groove of head 65 and shifting the locking pin into the groove 76 of heads 64 and 66 and bringing the notch 76 into alinement with head 65. Thereupon lever 72 may be swung toward casing 10 so as to shift gear 38 into mesh with gear 45, which is being constantly rotated by reason of the rotation of gears 21 and 22. The next higher speed forward is obtained by swinging lever 72 away from casing 10, first withdrawing gear 38 from mesh with gear 45 and then shifting gear 37 into mesh with gear 44. In order to obtain the next higher speed forward it is first necessary to bring lever 72 to the middle position and then shift said lever longitudinally so as to bring its finger 71 into the transverse groove of head 64. Lever 72 may then be swung away from casing 10 so as to shift clutch member 36 into engagement with clutch member 32 and thereby connect shaft 26 directly with shaft 19 so that it will rotate at the same speed. A still higher speed of shaft 26 may be obtained by swinging the lever 72 back through its middle position, so as to retract clutch member 36 from clutch member 32, and continue toward casing 10, thus shifting gear 83 into mesh with gear 43, the gear 83 being smaller than gear 43. In order to get a reverse rotation of shaft 26 lever 72 is brought back to its middle angular position and then shifted longitudinally until finger 71 comes into the groove of head 66. The lever 72 is then swung away from casing 10 so as to shift gear 55 first into mesh with gear 45 and then into mesh with gear 38, which will be in the position shown in Fig. 2, the gear 55, because of its width, remaining in mesh with gear 45.

The combined length of shaft 19, gear 21 and clutch 22 is less than the length of the interior of the gear chamber so that, when shaft 26 is drawn out (to the left Fig. 1), said shaft and attached parts may be moved inwardly into the casing and then extracted through opening 81.

I claim as my invention:

1. A transmission gearing comprising a main containing casing, a pair of alined shafts journaled therein, gears slidably mounted on one of said shafts within the casing, a gear carried by the other of said shafts within the casing, a countershaft journaled in the casing, a gear carried by said countershaft between the ends thereof and meshing with the last-mentioned gear, other gears carried by the countershaft in position to receive the said sliding gears, the said casing having, at that end of the countershaft opposite the first-mentioned counter-shaft-gear, a pocket of greater diameter than the diameter of the nearest countershaft-gear, and having a depth exceeding the projection of the countershaft beyond the first-mentioned countershaft-gear, and said casing also having a bearing-receiving opening in the bottom of said pocket exceeding the diameter of the adjacent end of the countershaft, a bearing removably mounted in said opening and supporting the adjacent end of the countershaft, and means by which the shiftable gears may be shifted.

2. A transmission gearing comprising a main containing casing, a pair of alined shafts journaled therein with the inner end of one shaft journaled in and supported by the inner end of the other shaft, gears slidably mounted on one of said shafts within the casing, a gear carried by the other of said shafts within the casing, a countershaft journaled in the casing, a gear carried by said countershaft between the ends thereof and meshing with the last-mentioned gear, other gears carried by the countershaft in position to receive the said sliding gears, the said casing having, at that end of the countershaft opposite the first-mentioned counter-shaft-gear, a pocket of greater diameter than the diameter of the nearest countershaft-gear, and having a depth exceeding the projection of the countershaft beyond the first-mentioned countershaft-gear, and said casing also having a bearing-receiving opening in the bottom of said pocket exceeding the diameter of the adjacent end of the countershaft, a bearing removably mounted in said opening and supporting the adjacent end of the countershaft, and means by which the shiftable gears may be shifted.

3. A transmission gearing comprising a main containing casing, a pair of alined shafts journaled therein, gears slidably mounted on one of said shafts within the casing, a gear carried by the other of said shafts within the casing, a countershaft journaled in the casing, a gear carried by said countershaft between the ends thereof and meshing with the last-mentioned gear, other gears carried by the countershaft in position to receive the said sliding gears, the said casing having, at that end of the countershaft opposite the first-mentioned counter-shaft-gear, a pocket of greater diameter than the diameter of the nearest countershaft-gear, and having a depth exceeding the projection of the countershaft beyond the first-mentioned countershaft-gear, and said casing also having a bearing-receiving opening in the bottom of said pocket exceeding the diameter of the adjacent end of the countershaft, a bearing removably mounted in said opening and supporting the adjacent end of the countershaft, means by which the shiftable gears may be shifted, and a reversing gear slidably journaled in the aforesaid pocket and shiftable from said pocket into simultaneous engagement with one of the countershaft gears and one of the sliding gears.

4. A transmission gearing comprising a main containing casing, a pair of alined shafts journaled therein with the inner end of one shaft journaled in and supported by the inner end of the other shaft, gears slidably mounted on one of said shafts within the casing, a gear carried by the other of said shafts within the casing, a countershaft journaled in the casing, a gear carried by said countershaft between the ends thereof and meshing with the last-mentioned gear, other gears carried by the countershaft in position to receive the said sliding gears, the said casing having, at that end of the countershaft opposite the first-mentioned counter-shaft-gear, a pocket of greater diameter than the diameter of the nearest countershaft beyond the first-mentioned countershaft-gear, and said casing also having a bearing receiving opening in the bottom of said pocket exceeding the diameter of the adjacent end of the countershaft, a bearing removably mounted in said opening and supporting the adjacent end of the countershaft, means by which the shiftable gears may be shifted, and a reversing gear slidably journaled in the aforesaid pocket and shiftable from said pocket into simultaneous engagement with one of the countershaft gears and one of the sliding gears.

5. A transmission gearing comprising a containing casing having a circumferentially-integral bearing-receiving boss at one end thereof, bearings mounted in said boss, a shaft journaled in said bearings, a gear carried by said shaft at its inner end within the casing, said shaft and gear having a combined length less than the length of the interior of the casing and having a bearing-receiving recess formed in its inner end, a bearing mounted therein, a second shaft having its inner end supported in said last mentioned bearing and outwardly axially withdrawable from the casing, a bearing supported in the opposite end of the casing and supporting said second shaft, and gears carried by said second shaft.

In witness whereof, I have hereunto set my hand and seal at Muncie, Indiana, this twenty-first day of January, A. D. one thousand nine hundred and ten.

FRANK H. JONES. [L. S.]

Witnesses:
C. E. DAVIS,
W. H. CHURCH.